United States Patent [19]

Brewster et al.

[11] 3,732,407

[45] May 8, 1973

[54] ERROR CHECKED INCREMENTING CIRCUIT

[75] Inventors: John Holt Brewster, Wheaton; Ted Leroy Hoffman, Aurora, both of Ill.

[73] Assignee: Bell Telephone Laboratories, Incorporated, Murray Hill, Berkeley Heights, N.J.

[22] Filed: Nov. 12, 1971

[21] Appl. No.: 198,211

[52] U.S. Cl. ........................235/153 BB, 235/153 AP

[51] Int. Cl. ..............................................G06f 11/10

[58] Field of Search ....................235/153 B, 153 BB, 235/153 AP, 92 EC

[56] References Cited

UNITED STATES PATENTS

| | | | |
|---|---|---|---|
| 3,141,962 | 7/1964 | Sakalay | 235/153 |
| 3,196,260 | 7/1965 | Pugmire | 235/153 |
| 3,567,916 | 3/1971 | Fullton, Jr. | 235/92 EC |
| 3,659,089 | 4/1972 | Payne et al. | 235/153 |

*Primary Examiner*—Charles E. Atkinson
*Attorney*—R. J. Guenther et al.

[57] ABSTRACT

An add-one circuit having an error checking arrangement in which common circuits are employed to predict the parity of the output word of the add-one circuit and to assure that a single "0" to "1" transition occurs during each incrementing operation. Single errors in the operation of the add-one circuit are fully detected by utilization of the transition detecting circuitry in combination with arrangements for comparing the predicted parity with the actual parity of the output word.

5 Claims, 3 Drawing Figures

ERROR CHECKED INCREMENTING CIRCUIT

BACKGROUND OF THE INVENTION

1. Field of the Invention

This invention relates to error checked add-one incrementing circuits.

2. Description of the Prior Art

Add-one circuits are a commonly used facility in data processors. Such circuits are used to advance through a program sequence or through a sequence of data. Accurate operation of these circuits is essential if proper processor operation is to be secured. A variety of circuit arrangements have been priorly employed to detect errors in the operation of add-one incrementing circuits. For example, it is known to predict parity under the assumption that the adder circuit will operate properly and to compare that predicted parity with the actual parity of the adder output count. Furthermore, there are arrangements wherein the carries are calculated individually in the counter stages and compared.

SUMMARY OF THE INVENTION

In accordance with the present invention, it is recognized that in the proper operation of an add-one circuit, one and only one "0" to "1" transition will occur during each incrementing operation. Accordingly, a portion of the error detecting circuitry is dedicated to a determination that only one such transition occurs and a portion of the same circuitry is employed to determine whether the transition occurs in the odd or even numbered stages of the adder in order to predict parity of the adder output count. If the "0" to "1" transition occurs in an even numbered cell of the adder, it is predicted that parity will change, while if the "0" to "1" transition occurs in an odd numbered cell, it is predicted that parity will not change. Failure to obtain an indication that a single "0" to "1" transition has occurred signifies an error in the operation of the adder circuit. In economically attainable circuits situations of multiple transitions arise in which case the transition detector indicates a single "0" to "1" transition. Complete detection of single errors in the adder circuitry can be achieved, however, by comparing the predicted parity with the actual parity and requiring that the transition detector and the parity comparator outputs concurrently indicate proper adder operation.

BRIEF DESCRIPTION OF THE DRAWING

This invention may be understood from the following description when read with respect to the drawing in which.

DETAILED DESCRIPTION

Figure 1:
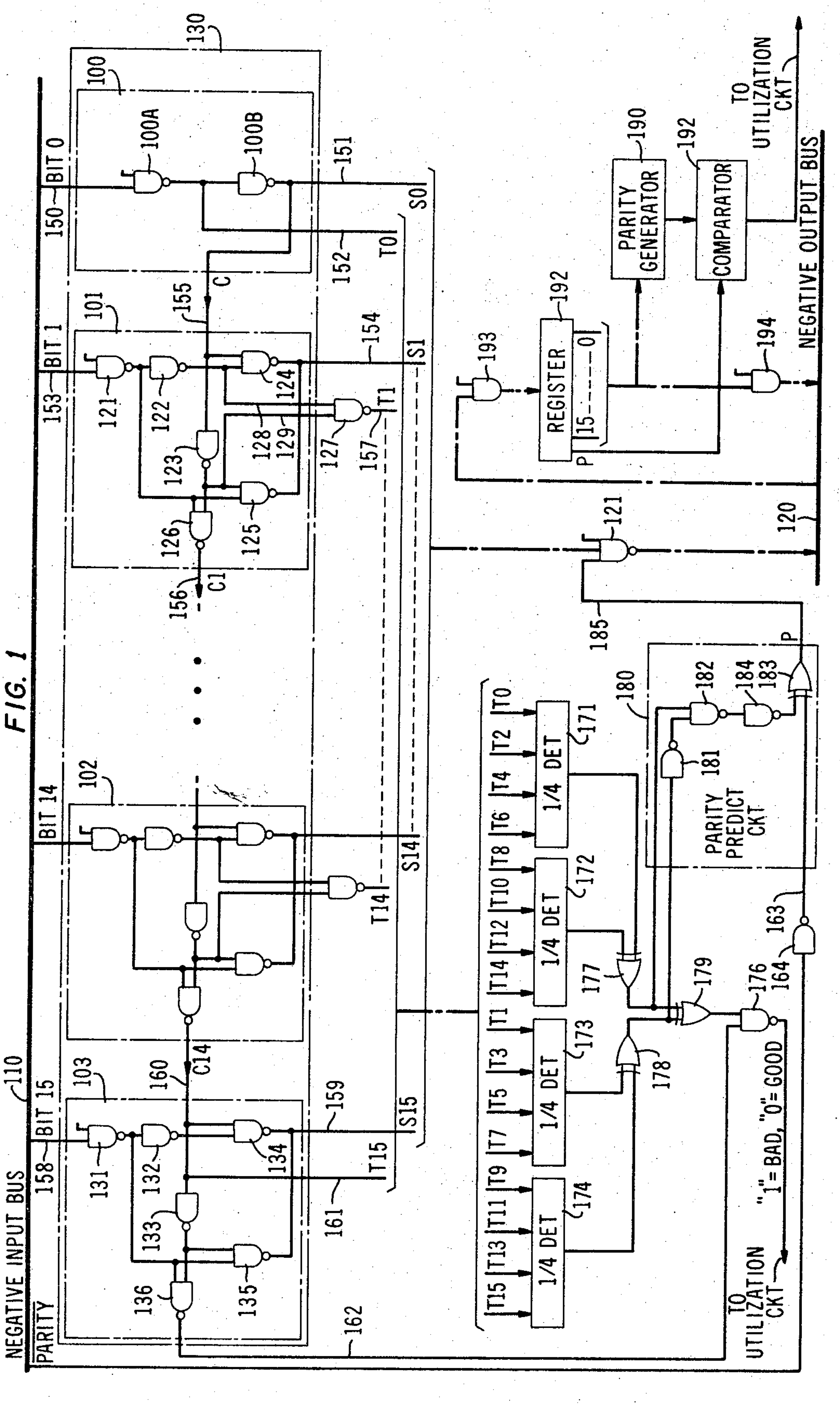
FIG. 1 is a circuit diagram of an illustrative embodiment of the invention.
Figure 2:
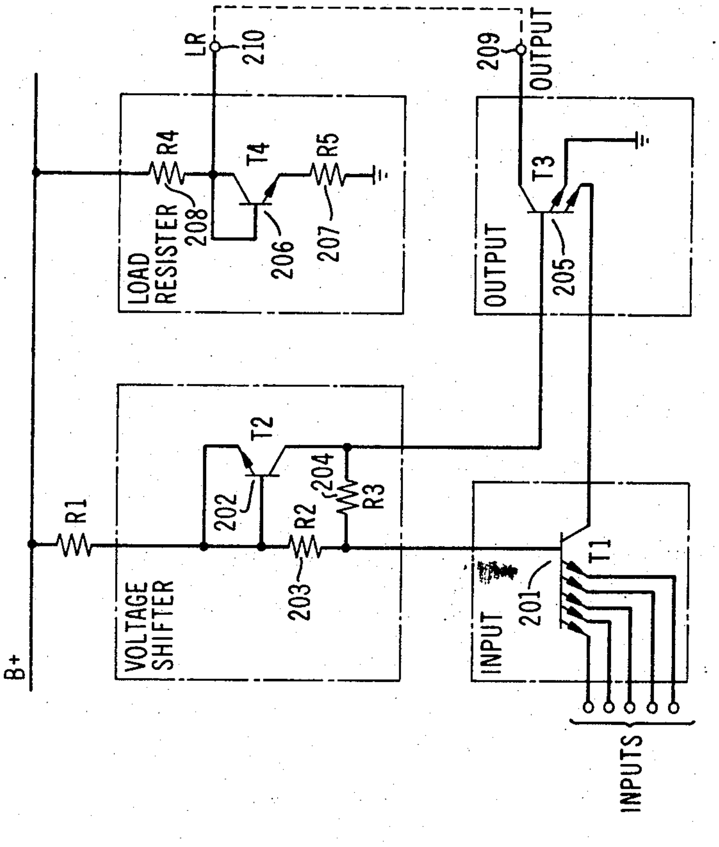
FIG. 2 is a detailed showing of a gate circuit employed in FIG. 1.

The illustrative embodiment of this invention, which is shown in FIG. 1, employs a 16-bit data word. FIG. 1 illustrates only that portion of a data processor which is necessary to an understanding of the present invention. The circuit arrangements of FIG. 1 are implemented by AND-NOT gate circuits which may advantageously comprise low level transistor circuits as shown in FIG. 2. Certain of the gates of FIG. 1 are provided for purposes of buffering and for purposes of providing conductor fanout (signal distribution). Such arrangements are solely limitations of the circuitry employed in the illustrative embodiment and are not essential to the practice of the invention.

The add-one incrementer 130 comprises 16 stages corresponding to the 16 bits of the data word to be processed. The first and last stages are different from each other and from the intermediate stages 2 through 14. The intermediate stages are identical to one another. In the illustrative embodiment of FIG. 1 it is assumed that a binary data word which is available in an inverted form, i.e., a binary "1" appears as a binary "0" and a binary "0" appears as a binary "1" on the negative input bus 110, is processed in the add-one incrementer 130 and is gated to the negative output bus 120. Each adder cell 100, 101, 102, and 103 includes circuitry for generating signals on corresponding output conductors T0, T1, etc., to indicate whether a "0" to "1" transition should occur during proper operation of the adder cell.

The first adder cell 100 comprises an input conductor 150 which is connected to its corresponding conductor of the input bus 110; an output conductor 151 which is connectable through gating circuit 121 to the corresponding conductor of the negative output bus 120. the T0 transition conductor 152 is connected to the one-out-of-four detecting circuit 171. Adder cell "0" is considered to be an even numbered stage and its transition conductor 152 is grouped in the detecting circuit 171 with the transition conductors of other even numbered adder cells 2, 4, and 6.

Adder cell 101 for bit one is representative of the intermediate adder cells 1 through 14. The cell 101 comprises an input conductor 153 which is connected to the corresponding conductor of the input bus 110; and output conductor 154 which is connectable to the negative output bus 120 through the symbolic gate circuit 121 (the symbolic gate represents a plurality of gates equal in number to the number of conductors gated); a carry input conductor 155 which is connected to the carry output of the preceding cell 100; a carry output conductor 156 which is connected to the carry input conductor of the succeeding cell; and a transition conductor 157 which is connected to its associated one-out-of-four detecting circuit 173. Cell 101 is employed to process bit one of the data word and is considered to be an odd numbered cell. Thus, the transition conductor 157 is grouped with the transition conductors of other odd numbered cells 3, 5, and 7.

The last adder cell 103 comprises an input conductor 158 which is connected to the corresponding conductor of the negative input bus 110; an output conductor 159 which is connectable to the negative output bus 120 through the gate 121; a carry input conductor 160 which is connected to the carry output conductor of the preceding cell 102; a transition conductor 161 which is connected to its associated one-out-of-four detecting circuit 174; and an overflow conductor 162 which is connected to the gate 176. The all "1's" count in the adder is an invalid value since when this count is incremented there will be no "0" to "1" transitions. Accordingly, when the overflow conductor 162 goes to the low state, the output of the gate 176 is forced to the "1" or "bad" state independently of the transition detecting circuitry. The transition conductor 161 is from an odd numbered cell; therefore it is grouped with the transition conductors of the other odd numbered cells.

Before proceeding to a detailed discussion of the operation of the adder cells, the operation of the transition detecting circuit and the parity predict circuit will be discussed.

The one-out-of-four detecting circuits 171, 172, 173, and 174 and the exclusive OR gate circuits 177 and 178 are employed by both the detecting circuitry and the parity predict circuitry.

As indicated earlier herein, the gate circuits employed in the illustrative embodiment of this invention comprise transistor logic, typically as shown in FIG. 2. The transistor 201 is an input transistor for the gate and has a plurality of emitters to accommodate a corresponding plurality of inputs. The transistor 202 (connected as a diode) and the resistor 203 and 204 comprise a voltage shifter from the gate; the transistor 205 comprises the output transistor of the gate; and the collector voltage supply and load resistor for the gate comprises the transistor 206 (connected as a diode), resistor 207, and resistor 208. The gate circuit output is taken between the terminals 209 and 210. The output signal of the gate of FIG. 2 is a value near ground when the inputs to the transistor 201 are all high and the output signal is a positive value when any one of the inputs to the transistor 201 is at a low value. In accordance with the general symbology used throughout this application, the low, near ground value corresponds to a binary "0" while the high positive voltage corresponds to a binary "1." In the adder stages the carry is indicated when the carry output conductor is in the low state, a transition is indicated when the transition conductor is in the low state, and the output signals on the conductors 151, 154, etc., follow the normal symbology and a "1" is represented by the positive value and the "0" by the near ground value.

Figure 3:
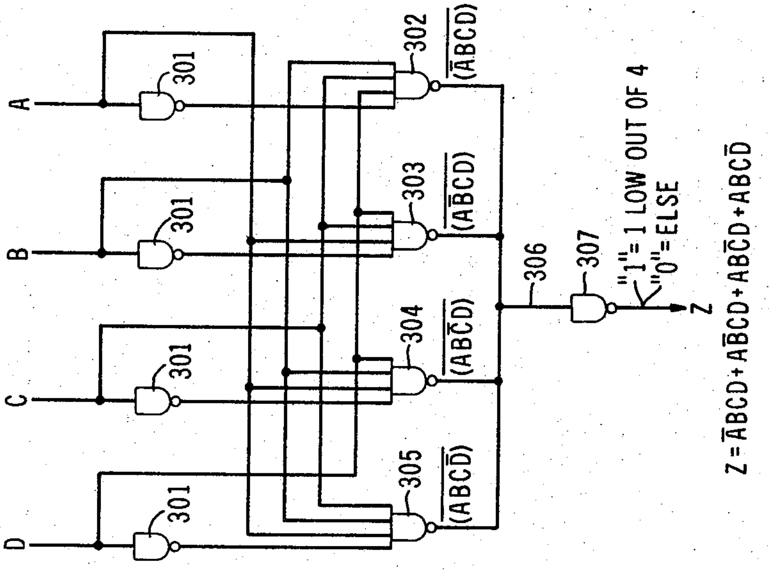
FIG. 3 is a schematic diagram of a one-out-of-four detecting circuit.

An illustrative embodiment of a one-out-of-four detecting circuit, e.g., 171, is shown in FIG. 3. The circuit of FIG. 3 is arranged to generate a high signal when a single one of its input conductors is in the low state and the remaining input conductors are in the high state, and is arranged to generate a low output signal for all other input conditions.

The input conductors A, B, C, and D of FIG. 3 are connected to corresponding transition conductors, e.g., T0, T2, T4 and T6. The gates 301 are inverters which serve to generate the complement of the transition signal which occurs on the corresponding input conductor. The gates 302, 303, 304 and 305 serve to combine the signals on the input conductors A through D and the signals at the output of the inverting gates 301 to generate a corresponding low output signal if the one-out-of-four condition is met. In the absence of a failure of one of the gates 301 or one of the gates 302 through 305 a low signal on conductor 306 is indicative of the condition wherein one and only one of the four input conductors is in the low state. The gate 307 is an inverting and buffering gate that serves to connect the one-out-of-four circuit to a corresponding exclusive OR gate, e.g., 177.

The exclusive OR gate circuits 177 and 178, like the one-out-of-four detecting circuits 171 through 174, are employed for both the transition detecting function and the parity predicting function. The output signals of the exclusive OR circuits 177 and 178 are combined in a further exclusive OR gate circuit 179, which is discrete to the transition detecting function. A high signal is to be expected at the output of the exclusive OR circuit 179 when a single "0" to "1" transition has been detected and is in the low state for all conditions other than the case in which three transitions are indicated. An indication of three simultaneous transitions requires multiple gate failures and the present invention is intended to guard against all single gate failures. As previously explained, the overflow condition from the all "1's" state of the adder is guarded against by connection of the overflow conductor 162 to the gate 176. A low signal representing a "0" on the output conductor of the gate 176 indicates apparent proper operation of the adder during incrementing while a "1" on that conductor indicates apparent improper operation of the adder circuit.

The output signals of the exclusive OR circuits 177 and 178 are inputs to the parity predict circuit 180. As previously indicated, a "0" to "1" transition in an even numbered cell causes a prediction of change in parity while a "0" to "1" transition is an odd numbered cell causes a prediction of no change in parity. The gate 181 serves to invert the output signal from the exclusive OR circuit 178 and the gate 182 combines this inverted output and the output of the exclusive OR circuit 177 to provide an input signal to the exclusive OR circuit 183 through inverting gate 184. The parity of the input word appears in inverted form on the negative input bus 110 and in standard form on the conductor 163 which is the output of inverting gate 164. The output of the gate 184 will be in the "1" state when the output of the exclusive OR circuit 177 and the output of the inverting gate 181 are both in a high state. These conditions signify that a "0" to "1" transition has occurred in an even numbered adder cell and no such transition has occurred in an odd numbered adder cell. When a "0" to "1" transition occurs in an odd numbered cell of the adder, the output of inverting gate 181 will be in the "0" state and the output of the gate 184 will similarly be in the "0" state. Accordingly, when the output of the gate 184 is in the "1" state the predicted parity will be the inverse of the parity on conductor 163, and when the output of gate 184 is in the "0" state the predicted parity will be the same as the parity on conductor 163.

The first adder cell 100 is of simplified construction since in an add-one circuit it is assumed that there is a carry into the first adder cell. The inverted form input on conductor 150 appears in standard form at the output of the inverter 100A. The inverter 100B serves to complement the signal at the output of 100A and thus presents on conductor 151 a signal which represents the complement of the value represented on conductor 150. For example, if a low signal which represents a "1" is present on conductor 150, a low signal will be present on conductor 151. However, this low signal represents a "0." Similarly, if a high signal which represents a "0" appears on conductor 150, a low signal will appear at the output of inverter 100A and a high signal which represents a binary "1" will appear on conductor 151. In both cases the necessary binary inversion of the first bit of the data word is accomplished. The carry output signal on conductor 155 corresponds to the output signal on conductor 151. A low signal on conductor 150 which represents a binary "1" in the input word, leads to a low signal on carry out conductor 155. Thus, a carry is generated when the signal on the input 150 represents a binary "1." Conversely, when the signal on conductor 150 is in the high state to represent a binary "0," a high signal is provided on conductor 155 which indicates no carry.

As previously indicated, the input signals to an intermediate adder cell, e.g., cell 101, comprise a carry signal on a carry conductor, e.g., conductor 155, and a negative data signal on an input conductor, e.g., conductor 153. The output conductors of the adder cell 101 comprise the data output conductor 154, also labeled S1 in the drawing, the transition conductor 157, also labeled T1, and the carry conductor 156, also labeled C1. The suffix 1 in each of these labels, S1, T1, and C1, indicates that these conductors are associated with adder cell 1. The corresponding conductors of other adder cells are similarly labeled with suffix numbers which correspond to the cell number. The input signals from the negative input bus 110 are inverted by the gate 121 and presented to the gates 125 and 126 in parallel. The output signals on conductor 154 are in standard form and a high signal represents a "1" and a low signal represents a "0." The gate 125 serves to produce a low signal on conductor 154 when the input signal on conductor 153 represents a binary "1" (a low signal represents a binary "1" at this point) and the signal on conductor 155 represents a carry from the preceding stage 100 (a low signal on conductor 155 represents a carry). The carry signal on conductor 155 is inverted by the inverter 123, the output of which is presented in parallel to the gates 125, 126, and 127. The gate 125 is enabled when a low signal occurs on conductor 153 and simultaneously a low signal occurs on conductor 155.

The gate 124 serves to produce a low signal on conductor 154 when the input data signal on conductor 153 represents a binary "0" (a high signal on conductor 153) and a signal on conductor 155 represents $\overline{\text{carry}}$ (a high signal on conductor 155 represents $\overline{\text{carry}}$). For the other combinations of conditions of signals on conductors 153 and 155, neither gate 124 nor gate 125 will be enabled and the output signal on conductor 154 will represent a binary "1."

The transition conductor 157, also labeled T1, is in the low state when the input signal on conductor 153 represents a binary "0" and the carry signal on conductor 155 represents a carry. The operation of gate 127 may be understood from the following discussion. A high signal on conductor 153 (representing a binary "0") is twice inverted in gates 121 and 122 and provides a high input signal to gate 127. A carry signal (a low signal) on conductor 155 is inverted by gate 123 and provides a high signal on conductor 129 to the input of gate 127. Accordingly, with high signals on conductors 128 and 129 a low signal representing a "0" to "1" transition is generated on conductor 157.

A carry is generated on conductor 156 which is the output of gate 126 when the input signal on conductor 153 represents a binary "1" (a low signal) and a carry signal (low signal) is present on conductor 155. The input signal on conductor 153 representing a binary "1" (a low signal) is inverted in gate 121 to provide a high input signal to the gate 126 while the carry signal (a low signal) on conductor 155 is inverted in gate 123 and provides a second high input signal to gate 126. With the two high input signals present at the input of gate 126 a low signal representative of a carry appears on conductor 156.

The remaining intermediate cells 2 through 14 of the adder are identical in construction and operation to the first intermediate cell 101.

The final adder cell 103 operates generally like the intermediate cells, however, it is a slightly simplified structure wherein a transition on conductor 161 is indicated simply by the state of the carry conductor 160 without reliance on the past state of that cell. It is assumed that during normal operation of the incrementer the last adder stage will be in the "0" state prior to the time that stage is incremented. If the last cell of the adder stage reaches the "1" state then a succeeding carry signal from the preceding stage will cause a low output signal on conductor 162 as previously indicated. Such a low output signal will cause a high signal at the output of the gate 176 to indicate improper operation of the incrementing circuit.

What is claimed is:

1. A self-checking circuit for incrementing a data word obtained from a data word source comprising:
   - a plurality of serially connected adder stages having input terminals connected to corresponding output terminals of said data word source, a plurality of output terminals connected to a data utilization circuit and transition detecting means individual to said stages for generating at output terminals thereof output signals defining "0" to "1" transitions in said adder stages when a data word is applied to said input terminals of said incrementing circuit;
   - circuit means connected to said output terminals of said detecting means for generating a first signal if a single transition of the type above defined occurs during an incrementing function and for generating signals predicting the parity of the data word occurring at said output terminals of said adder stages.

2. A circuit for incrementing a data word in accordance with claim 1 wherein said circuit means comprises first and second one-out-of-*n* detecting means for generating an output signal of a first character if a single transition of the type above defined is to occur in the stages to which said one-out-of-*n* detecting means is connected, said first one-out-of-*n* detecting means being connected to the odd numbered ones of said adder stages and said second detecting means being connected to the even numbered ones of said adder stages, and means connected to the output terminals of said one-out-of-*n* detecting means for generating an output signal of a first character if a transition is to occur in an odd numbered one of said adder stages and a signal of a second character if a transition is to occur in an even numbered one of said adder stages.

3. A circuit for incrementing a data word obtained from a data word source by a count of one comprising:

a plurality of serially connected adder stages arranged in two groups identified as even numbered stages and odd numbered stages, respectively, having input terminals connected to corresponding output terminals of said data word source, a plurality of output terminals connected to a data utilization circuit and transition detecting means individual to said adder stages for generating at output terminals thereof output signals indicating that a transition from a "0" binary state to a "1" binary state is to occur in a connected adder stage; and fault detecting means connected to said output terminals of said transition detecting means for generating a fault signal if said transition detecting means indicate that no transition is to occur or that a transition is to occur in both said odd numbered and said even numbered stages and parity generating means connected to said output terminals of said transition detecting means and to the parity bit output terminal of said data word source for generating a predicted parity signal for the data word appearing at the output terminals of said adder stages.

4. A circuit for incrementing a data word in accordance with claim 3 comprising:

second parity generating means connected to said data utilization circuit for generating a parity signal for a data word occurring at said output terminals of said incrementing circuit and a comparator circuit for comparing said predicted parity signal and said parity signal generated by said parity generating means and for generating a fault signal if said parity signals are not identical.

5. A self-checking circuit for incrementing a data word obtained from a data word source comprising:

a plurality of serially connected adder stages having input terminals connected to corresponding output terminals of said data word source and a plurality of output terminals;

a data utilization circuit connectable to said output terminals;

the odd numbered ones of said adder stages comprising first transition detecting means for generating signals indicating that a single "0" to "1" transition should occur in said connected adder stages during the incrementing of said data word obtained from said data word source;

the even numbered ones of said adder stages comprising a second transition detecting circuit for generating signals indicating that a single "0" to "1" transition should occur in said connected adder stages during the incrementing of said data word obtained from said data word source;

first parity generating means connected to the output terminals of said first and second second transition detecting circuits and responsive to said output signals therefrom and connected to the parity bit output terminal of said data word source for generating a predicted parity bit for the incremented data word;

second parity generating means connected to said data utilization circuit for generating a parity signal for a data word presented to said data utilization circuit from said incrementing circuit;

means for comparing said predicted parity signal and said parity signal from said second parity generating means and for generating a trouble signal when said parity signals are not identical; and circuit means connected to said output terminals of said first and said second transition detecting means for generating error signals if said first and said second transition detecting means generate identical output signals during said incrementing of said data word.

* * * * *